United States Patent [19]

Conn et al.

[11] 3,759,987

[45] Sept. 18, 1973

[54] PREPARATION OF 5-FLUORO-2-METHYL-1-(P-METHYLSULFINYLBENZYLIDENE)-3-INDENYL ACETIC ACID

[75] Inventors: John B. Conn; Frederick W. Bollinger, both of Westfield, N.J.

[73] Assignee: Merck & Co., Inc., Rahway, N.J.

[22] Filed: May 1, 1970

[21] Appl. No.: 33,974

[52] U.S. Cl. .......... 260/515 A, 260/141, 260/456 P, 260/469, 260/470, 260/516, 260/562 R, 260/592, 424/308
[51] Int. Cl. ......................................... C07c 147/00

[58] Field of Search ................................. 260/515 A

[56] References Cited
UNITED STATES PATENTS 3,532,752   10/1970   Shen ................................ 260/570.8

*Primary Examiner*—James A. Patten
*Attorney*—Martin L. Katz, Harry E. Westlake, Jr. and I. Louis Wolk

[57] ABSTRACT

Process for preparing 1-(p-methylsulfinylbenzylidene)-3-indenyl acetic acids by introducing a methylsulfinyl group into a 1-benzylidene-3-indenyl acetic acid.

1 Claim, No Drawings

PREPARATION OF 5-FLUORO-2-METHYL-1-(P-METHYLSULFINYLBENZYLIDENE)-3-INDENYL ACETIC ACID

This invention relates to a process for preparing novel 5-fluoro-2-methyl-1-(p-methylsulfinylbenzylidene)-3-indenyl acetic acid. This compound has anti-inflammatory, anti-pyretic and analgesic activity and is useful in the treatment of diseases which cause pain, fever, or inflammation. In the treatment of such diseases, 5-fluoro-2-methyl-1-(p-methylsulfinylbenzylidene)-3-indenyl acetic acid may be administered topically, orally, rectally or parenterally in dosage ranges of from about 0.1 mg. to 50 mg./kg. body weight per day (preferably from about 1 mg. to 15 mg./kg. body weight per day).

In the past, other 1-benzylidene-3-indenyl acetic acids have been prepared by condensing a substituted benzaldehyde with a substituted acetic acid ester in a Claisen Reaction or with an α-halogenated propionic acid ester in a Reformatsky Reaction. The resulting unsaturated ester was reduced and hydrolyzed to give a β-aryl propionic acid which was ring closed to form an indanone. the aliphatic acid side chain was then introduced by a Reformatsky or Wittig Reaction and the 1-substituent was introduced into the resultant indenyl acetic acid or ester by reacting said acetic acid derivative with an aromatic aldehyde or ketone of the desired structural formula and dehydrating to form the desired indenyl acetic acid.

It is an object of this invention to provide a new process for preparing this compound. It is a further object of this invention to provide a new process for preparing this compound in which the methylsulfinyl group is introduced after the benzylidene group is in the 1-position of the indene nucleus. Other objects will become apparent hereinafter.

In accordance with this invention, it has been discovered that 5-fluoro-2-methyl-1-(p-methylsulfinylbenzylidene)-3-indenylacetic acid can be prepared by introducing a methylsulfinyl group into a 1-benzylidene-5-fluoro-2-methyl-3-indenyl acetic acid.

The process of the present invention may be carried out by many alternative routes. For example, a Friedel-Crafts condensation may be used in which a 1-benzylidene-3-indenyl acetic acid ester is reacted with a methanesulfinyl halide. Alternatively, a 5-fluoro-1-(p-hydroxybenzylidene)-2-methyl-3-indenylacetic acid can be methysulfenated to produce a 1-(p-methylsulfenyloxybenzylidene)-3-indenyl acetic acid which is rearranged in the presence of a base to produce the desired end products.

The benzylidene may contain a mercapto group which is protected as for example

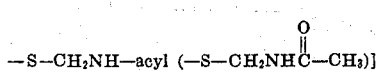

and reacted according to the following reaction sequence shown in Flow Sheet I:

Flow sheet 1

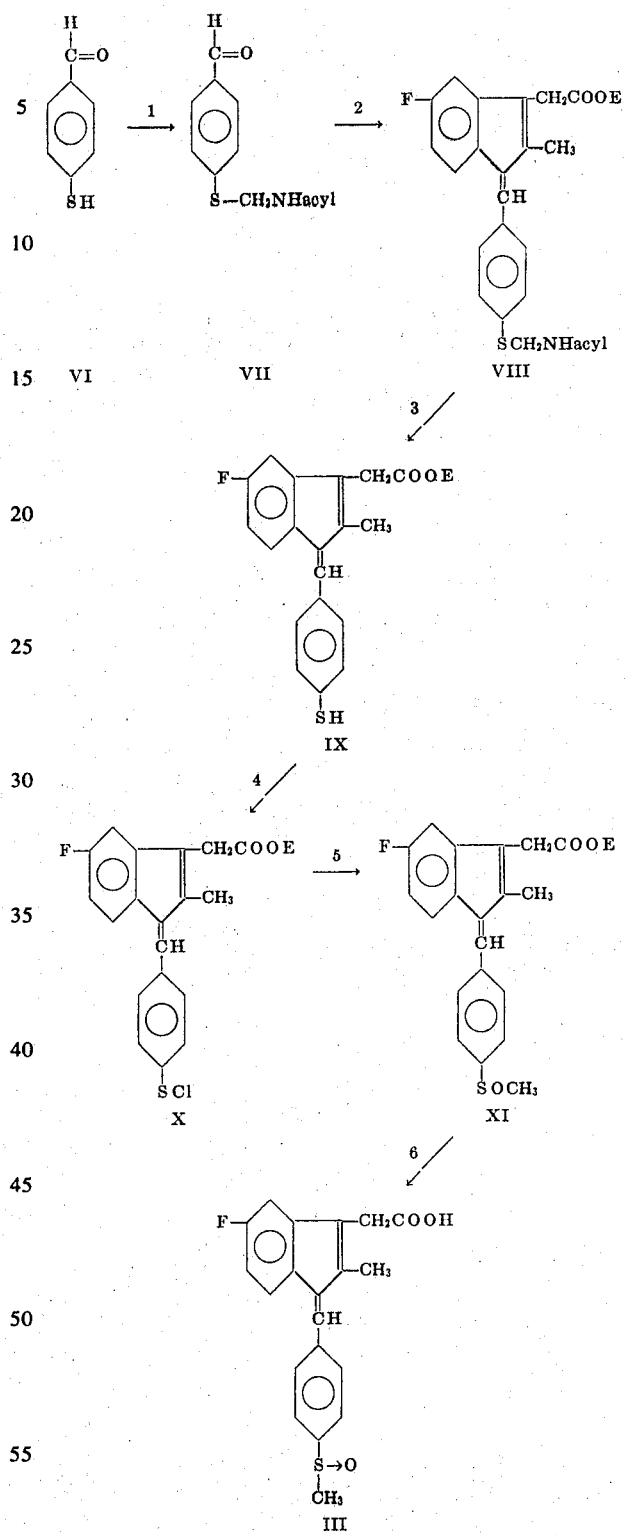

Reagents and Conditions
1. Reaction with acetamidomethanol in aqueous solution at pH 0.5 at room temperature.
2. Reaction with methyl substituted indenyl acetate in absolute alkanol solution in presence of alkali metal alkoxide.
3. De-blocking of sulfhydryl group by reaction with mercuric acetate in methanol, followed by precipitation of mercury with hydrogen sulfide.

4. Chlorination at −30°C. in anhydrous methylene chloride.
5. Reaction with anhydrous methanol in presence of triethylamine at not above 0°C.
6. Rearrangement in absolute alkanol solution in presence of catalytic amount of alkali metal alkoxide, followed by saponification.

When it is desired to use a starting material wherein the benzylidene radical contains a protected NH₂ group [as for example —NYacyl (—NHCOCH₃)], one may proceed as follows: 4-acetylaminobenzaldehyde is condensed with 2-methyl substituted 3-indenyl acetate or propionate ester. The product is digested with hydrochloric acid to hydrolyze the ester and acetyl functions, after which the liberated amino group is diazotized, then treated with sulfur dioxide and copper. The sulfinic carboxylic acid is converted to diester via the diacid chloride, and treated with exactly 2 moles of methyl magnesium halide, whereby the sulfinate becomes sulfoxide, and the carboxylate ester is converted to ketone. The synthesis is completed by degrading the ketone to acetate or propionate by the haloform reaction.

When it is desired to use a starting material containing a p-chlorobenzylidene group, it is reacted with magnesium to form a Grignard reagent, which is reacted with methanesulfinate or another methylsulfinyl containing reagent to produce the desired 5-fluoro-2-methyl-1-(p-methylsulfinylbenzylidene)-3-indenyl acetic acid.

When it is desired to oxidize a methylthio group to form a methylsulfinylbenzylidene substituent in the 1-position of the indene nucleus, there are several alternative paths.

For example, the sulfinyl group may be introduced by controlled oxidation of the sulfide by use of periodate, peroxyacids, peroxyperfluoroacids, ozone, hydrogen peroxide with and without vanadium pentoxide catalysis, hypohalites such as alkali metal hypohalites, hypohalite esters, t-butyl hypochlorite, compounds hydrolizable to hypohalites such as N-halosuccinimide, N-haloacetamide, N-haloamides, hydroperoxides, maganese dioxide, selenium dioxide, nitric acid, chromic acid, chromate salts, dinitrogen tetroxide, iodosobenzene, Caro's acid, lead tetracetate, ruthenium tetroxide, peracid salts such as permanganate and persulfate without reference to the cation. Oxidation with optically active per-acids gives a significant yield of an optically active sulfoxide product. S-(+)-per-acids give R-(+)-sulfoxides and vice versa. Otically active per-acids which have been successfully used are 1-S-percamphoric, R- and S-perhydrotropic and R- and S-per-α-methyl-1-naphthylacetic acids. Lowering the temperature of oxidation to −50° yields a product of greater stereospecificity.

In order to separate the optically active sulfoxide from racemic material with good efficiency, the well-established technique of zone refining has been invoked. In practice a few oxidations and zone refinings would be done on crudes to secure small samples of R- and S- enantiomorphs for construction of a binary phase diagram and differential thermal analysis. The racemic product can be easily reduced to sulfide by excess bisulfite, zinc and acetic acid or hydriodic acid in acetic acid for reoxidation and recycling.

The sulfinyl group may be introduced by interchange reactions as follows:

R₂ may be methyl, loweralkyl while (R₂)₂ may be ethylene, propylene alkylene, trimethylene, polymethylene, heterocyclic, such as 1,4-dithiane-1,4-dioxide. Selenoxides of the radicals mentioned above may be used as oxidizing agents. The oxidation may be electrolytic by supplying the proper electrode oxidizing potential. Also among the oxidation methods is the use of pyridinium bromide perbromide and its analogs.

Alternatively, the related sulfone may be reduced to the sulfoxide by procedures known in the art.

Aother type of condensation involves the Grignard reagent, methyl magnesium halide reacting with the sulfinate ester, sulfinyl chloride or other sulfinic acid derivatives.

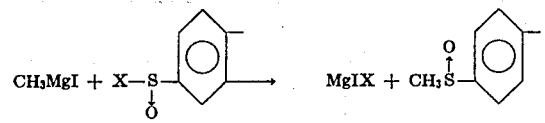

X = halogen, methoxy, alkoxy.
The alternate reaction is also possible.

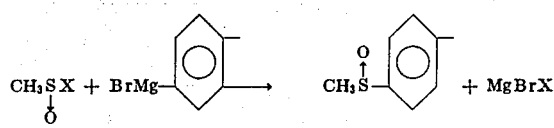

Less preferred but possible is a Friedel-Crafts type reaction.

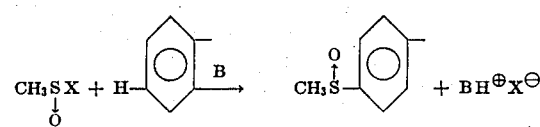

The introduction of the methylsulfinyl group may also be accomplished by the following reaction sequence:

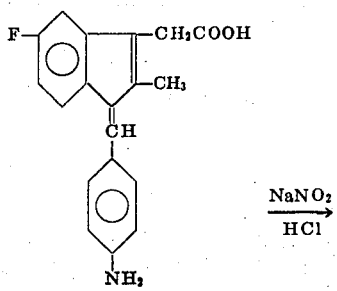

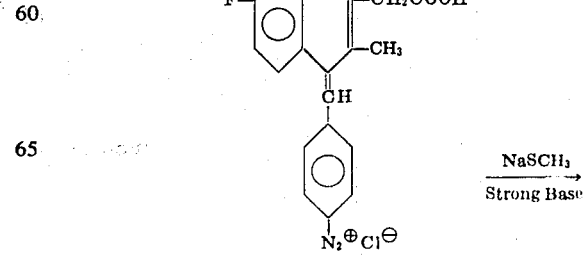

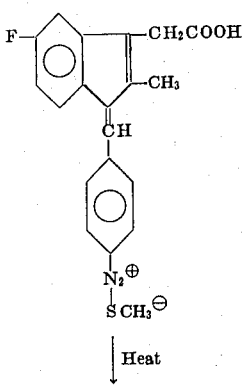

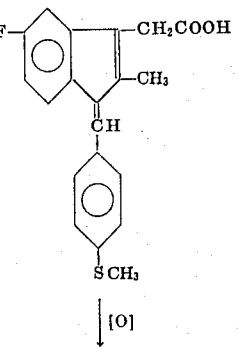

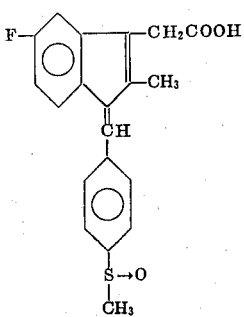

The starting materials for the process of the present invention may be prepared by forming the β-aryl propionic acid from p-acetylaminobenzyl chloride, p-acetylaminobenzaldehyde or any other acylaminobenzyl halide or aldehyde by a malonic ester synthesis. The β-aryl propionic acid is then ring closed to form an indanone and the aliphatic acid side chain is introduced by a Reformatsky or Wittig Reaction. The benzylidene group containing the desired substituent is then introduced by reacting said indenyl acetic acid with an aromatic aldehyde of the desired configuration.

It should be noted by one skilled in the art that 5-fluoro-2-methyl-1-(p-methylsulfinylbenzylidene)-3-indenyl acetic acid may be isomerized from cis to trans-isomers and vice versa by procedures well known in the art. The cis-isomer is that isomeric form in which the benzylidene function is aligned under the phenyl ring of the indene nucleus. It should be further noted that the cis-isomer is substantially more active than the trans-isomer.

It should be further noted by one skilled in the art that cis-5-fluoro-2-methyl-1-(p-methylsulfinylbenzylidene)-3-indenyl acetic acid is asymmetric and may be resolved into its (+) and (−) forms by procedures well known in the art.

It should be further noted by one skilled in the art that this compound is polymorphic and has more than one crystalline structure.

The following examples are presented to further illustrate the present invention.

EXAMPLE 1

D,L-cis-5-Fluoro-2-methyl-1-(p-methylsulfinylbenzylidene)-3-indenyl acetic acid

Methyl 1-benzylidene-2-methyl-5-fluoro-3-indenyl acetate (30.4 g., 0.1 mole), which is prepared by reacting methyl 5-fluoro-2-methyl-3-indenyl acetate with benzaldehyde, is dissolved in 500 ml. anhydrous nitromethane, and 10 g. titanium tetrachloride is added with cooling. After the thermal effect has dissipated, 9.86 g. (0.1 mole) freshly prepared methanesulfinyl chloride is added dropwise with stirring and vigorous exclusion of air and moisture. Hydrogen chloride is evolved; the mixture is allowed to stand under stirring at room temperature until no more bubbles are observed to form. The reaction product is thereafter cautiously quenched in vigorously stirred ice water (1 liter) and the organic materials are separated from the suspension by extraction with three 100 ml. portions of chloroform. The extracts are dried over anhydrous magnesium sulfate, solvents are removed, and the residue is subjected to saponification in N aqueous-alcoholic sodium hydroxide. Acidification precipitates crude 5-fluoro-2-methyl-1-(p-methylsulfinylbenzylidene)-3-indenyl acetic acid, which is purified by recrystallization, m.p. 184–186°C.

EXAMPLE 2

D,L-cis-5-Fluoro-2-methyl-1-(p-methylsulfinylbenzylidene)-3-indenyl acetic acid

Methyl 1-(p-hydroxybenzylidene)-2-methyl-5-fluoro-3-indenyl acetate (30.6 g., 0.1 mole), which is prepared by reacting methyl 5-fluoro-2-methyl-3-indenyl acetate with p-hydroxybenzaldehyde, is dissolved in 300 ml. anhydrous methylene chloride, 15 ml. anhydrous triethylamine is added and under stirring and ice-cooling, 8.26 g. (0.1 mole) freshly prepared methanesulfenyl chloride in 50 ml. dry methylene chloride is added dropwise. At the conclusion of the reaction, the suspension is filtered from triethylamine hydrochloride, and the solvent is removed under reduced pressure. The residue, which consists of methyl-5-fluoro-2-methyl-1-(p-methylsulfenyloxybenzylidene)-3-indenyl acetate, is taken up in 300 ml. anhydrous methanol under nitrogen, 0.5 g. sodium methoxide is added as catalyst, and the mixture is refluxed for 12 hours under nitrogen. When rearrangement is complete, the mixture is diluted with water, and sufficient sodium hydroxide is added to bring about saponification of the ester. The crude product is precipitated by acidification, and purified by recrystallization, m.p. 184–186°C.

EXAMPLE 3

D,L-cis-5-Fluoro-2-methyl-1-(p-methylsulfinylbenzylidene)-3-indenyl acetic acid

A. 4-(Acetamidomethylthio) benzaldehyde

Sodium 4-mercaptobenzaldehyde, prepared from 16.3 g. (0.1 mole) 4-thiocyanatobenzaldehyde as described by Friedlander and Lenk, is added all at once under vigorous stirring to a solution of 10 g. (excess over 0.1 mole) acetamidomethanol in 200 ml. 0.3 N hydrochloric acid at room temperature. The initial emulsion soon changes to a mass of nearly colorless crystals which are recrystallized from benzene-petroleum ether to yield pure 4-(acetamidomethylthio)-benzaldehyde.

B. Methyl-1-(p-acetamidomethylthiobenzylidene)-2-methyl-5-fluoro-3-indenyl acetate This compound is prepared from 22.0 g. (0.1 mole) methyl 5-fluoro-2-methyl-3-indenyl acetate and 20.8 g. (0.1 mole) 4-(acetamidomethylthio) benzaldehyde according to Example 1.

C. Methyl 1-(4'-mercaptobenzylidene)-2-methyl-5-fluoro-3-indenyl acetate

The product of Step B (39.2 g., 0.1 mole) is dissolved in 500 ml. methanol and 31.9 (0.1 mole) mercuric acetate is added. Separation of crystalline S-mercury derivative occurs in part; when removal of the sulfur-blocking group is judged complete, the mixture is saturated with hydrogen sulfide. black mercuric sulfide is removed by filtration, and from the filtrate, methyl 1-(4'-mercaptobenzylidene)-2-methyl-5-fluoro-3-indenyl acetate is recovered by crystallization.

Methyl 1-(4'-methoxythiobenzylidene)-2-methyl-5-fluoro-3-indenyl acetate

A thoroughly dry 2 l. flask is fitted with stirrer, dropping funnel, gas inlet tube, and exit tube protected by a bubbler containing concentrated sulfuric acid. The flask is charged with 750 ml. anhydrous methylene chloride. Into the dropping funnel is placed a solution of 34.0 g. (0.1 mole) methyl 1-(4'-mercaptobenzylidene)-2-methyl-5-fluoro-3-indenyl acetate in 250 ml. anhydrous methylene chloride. The stirrer is started and the flask is chilled to −30° in a bath consisting of shaved ice, diethylene glycol monomethyl ether, plus lumps of dry-ice. Dry chlorine, mixed with enough dry nitrogen to prevent any suck-back, is admitted slowly; the stopcock of the dropping funnel is opened, and the mercaptobenzylidene indenyl ester solution is admitted dropwise at such a rate that no great excess of chlorine is present at any time. When all of the ester has been introduced, chlorine is turned off, and the nitrogen flow increased to purge the excess chlorine as quickly as possible. The dropping funnel is charged with 100 ml. anhydrous methanol, 100 ml. anhydrous methylene chloride, and 30 ml. anhydrous triethylamine. The mixture is admitted dropwise with vigorous stirring and maintenance of low temperature. At the conclusion, the flask contents are allowed to come to room temperature under nitrogen, the suspended triethylamine hydrochloride is filtered off, and the solvents are evaporated under reduced pressure at not about 40°. The residue is taken up in just sufficient methylene chloride and brought to crystallization by addition of hexane, thereby recovering pure methyl 1-(4'-methoxythiobenzylidene)-2-methyl-5-fluoroindenyl acetate.

E. The product of Part D is dissolved in 300 ml. absolute methanol, 0.5 sodium methoxide is added as catalyst, and the mixture is refluxed under nitrogen to bring about rearrangement of the methoxythio group to methylsulfinyl. When the process is complete, water and sodium hydroxide (0.2 mole) are added, and the mixture is heated to saponify the ester. Crude 5-fluoro-2-methyl-1-(p-methylsulfinylbenzylidene)-3-indenyl acetic acid is recovered by acidification and purified by recrystallization, m.p. 184–186°C.

EXAMPLE 4

D,L-cis-5-Fluoro-2-methyl-1-(p-methylsulfinylbenzylidene)-3-indenyl acetic acid.

A. Methyl 1-(4'-acetylaminobenzylidene)-2-methyl-5-fluoro-3-indenyl acetate

Methyl 5-fluoro-2-methyl-3-indenyl acetate (44.0 g., 0.2 mole) is condensed with 32.6 g. (0.2 mole) 4-acetyl-aminobenzaldehyde by the general procedure of Example 1.

B. 1-(4'-Sulfinylbenzylidene)-2-methyl-5-fluoro-3-indenyl acetic acid

The product of Part A (36.5 g., 0.1 mole) is suspended in 500 ml. 2N hydrochloric acid and refluxed until complete hydrlysis of ester and amide has occured. The mixture is then chilled to 0° and diazotized with 7 g. sodium nitrite in 50 ml. water added dropwise under stirring. At the end of the diazotization, the solution is saturated with sulfur dioxide. Copper powder is dusted in under good stirring until effervescence ceases and the solution gives no color with sodium 1-naphthol 4-sulfonate. The product is a suspension of the sulfinic acid and copper powder; it is shaken with 50–100 ml. portions of chloroform until no more organic matter is extracted. The combined extracts are washed with water and then with sodium bicarbonate solution until there is no more effervescence, thereby separating the diacid fraction from by-products. From the aqueous phase, the acids are precipitated by adjusting to pH 2, and thereafter recrystallized to obtain pure sulfinic acid.

Methyl 1-(4'-methoxysulfinylbenzylidene)-2-methyl-5-fluoro-3-indenyl acetates 1-(4'-Sulfinylbenzylidene)-2-methyl-7-fluoro-3-indenyl acetic acid (37.2 g., 0.1 mole) is mixed with 75 ml. thionyl chloride and heated on the steam cone until evolution of sulfur dioxide and hydrogen chloride have ceased. The excess thionyl chloride is stripped off under reduced pressure and the residue of 1-(4'-chlorosulfinylbenzylidene)-2-methyl-5-fluoro-3-indenyl acetyl chloride is taken up in 300 ml. anhydrous methylene chloride.

Methanol (7 g., slight excess over 0.2 mole) and 35 ml. triethylamine are dissolved in 300 ml. anhydrous methylene chloride and charged into a 2 liter flask fitted with dropping funnel, stirrer, and drying tube. The indenyl acetyl chloride prepared above is charged to the funnel, the mixture is cooled in dry-ice methanol, and the acid chloride added dropwise. When all has been consumed, the suspension is allowed to warm to room temperature under stirring, filtered from triethylamine hydrochloride, and the methyl ester is separated by fractional crystallization or by chromatography on silica gel.

D. 5-Fluoro-2-methyl-1-(p-methylsulfinylbenzylidene)-3-indenyl acetones

Methyl 1-(4'-methoxysulfinylbenzylidene)-2-methyl-5-fluoro-3-indenyl acetate (31.6 g., 0.05 mole) and 500 ml. absolute ether are charged to a 2 l. flask fitted with stirrer, nitrogen inlet, reflux condenser, drying tube, and dropping funnel. Into the funnel is placed 100 ml. commercial 1N methyl magnesium chloride in absolute ether and 100 ml. ether as diluent. Dry nitrogen is passed through the system, the flask is cooled in ice, and under vigorous stirring, the Grignard reagent is added over 1 hour. When all of the Grignard has been consumed, the product is allowed to reach room temperature while maintaining stirring, and finally brought to gentle reflux for 2 hours. Cooling is reapplied, and the mixture is quenched by slow addition of 100 ml. 1N acetic acid. The ether layer is separated, the aqueous phase is extracted twice with 100 ml. portions of ether, and the combined extracts are dried over anhydrous magnesium sulfate. The ether is removed on the steam cone, and menthol by warming at 0.5 mm. pressure. The residue is recrystallized from ether-hexane to yield pure 5-fluoro-2-methyl-1-(p-methylsulfinylbenzylidene)-3-indenyl acetone.

E. A solution prepared from 165 ml. commercial sodium hypochlorite solution (5 percent active chlorine), 3.5 g. sodium hydroxide pellets, and water to 500 ml. is chilled to 0° in a constant temperature bath. Under vigorous stirring, 17.7 g. (0.05 mole) finely-pulverized 5-fluoro-2-methyl-1-(p-methylsulfinylbenzylidene)-3-indenyl acetone is added, followed by sufficient 1 percent aqueous sodium dioctylsulfosuccinate to bring about thorough wetting of the powder. The suspension is maintained under stirring at 0° until a probe shows no microscopic evidence of any residual ketone (12–18 hours). If any hypochlorite is detected by starch-iodine test at this point, it is destroyed by a little bisulfite. Glacial acetic acid is then added to formation of a heavy precipitate, which is filtered and recrystallized from alcohol, yielding pure 5-fluoro-2-methyl-1-(p-methylsulfinylbenzylidene)-3-indenyl acetic acid, m.p. 184–186°C.

EXAMPLE 5

D,L-cis-5-Fluoro-2-methyl-1-(p-methylsulfinylbenzylidene)-3-indenyl acetic acid

A. Methyl 1-(4'-chlorosulfinylbenzylidene)-2-methyl-5-fluoro-3-indenyl acetate

In a 1 liter flask equipped with a stirrer, gas inlet tube with sleeve permitting adjustment of height, dropping funnel, and exit tube with calcium chloride protector, is placed 34.04 g. (0.1 mole) pure methyl 1-(4'-mercaptobenzylidene)-2-methyl-5-fluoro-3-indenyl acetate (prepared as described in Example 3, Steps A–C). Dry nitrogen is swept through the assembly, and 400 ml. anhydrous methylene chloride is added through the dropping-funnel under stirring, the gas inlet tube being positioned so that it does not become immersed in the solution. When the indenyl ester has dissolved, the flask is lowered into a Dry-Ice-methanol bath. After the flask contents have reached bath temperature, the nitrogen sweep is partially replaced by dry chlorine; the halogen is absorbed with evolution of heat and appearance of an orange coloration due to sulfenyl chloride. Eventually the coloration fades out, and a crystalline material is present (the trichlorothiobenzylidene compound). At this point, chlorine flow is interrupted and the excess is swept out with nitrogen. The dropping funnel is now charged with a solution of 3.204 g. (0.1 mole) anhydrous methanol in 50 ml. anhydrous methylene chloride. This is allowed to flow dropwise into the flask, and the dropping funnel is afterward washed with two 10 ml. portions of anhydrous methylene chloride. The flask is raised from the cold bath and allowed to warm up spontaneously under continuous nitrogen flow and stirring. Evolution of hydrogen chloride and methyl chloride begins at −10° to 20°. When it subsides, the nitrogen tube is lowered beneath the liquid surface and the sweep is continued until the exit gas is substantially free from hydrogen chloride. The volume of methylene chloride is now reduced by distillation from the steam-cone until signs of crystallization appear. After cooling, enough methylene chloride is added to effect complete solution, and the product is transferred to a dropping funnel with washing of the flask with the solvent.

B. Methyl 5-fluoro-2-methyl-1-(p-methoxysufinylbenzylidene)-3-indenyl acetate

This compound is prepared from the product of Part A as described in Example 4, Part C.

The final operations are carried out in accordance with Example 4, Parts D and E and 5-fluoro-2-methyl-1-(p-methylsulfinylbenzylidene)-3-indenyl acetic acid, m.p. 184–186°C. is obtained.

EXAMPLE 6

D,L-cis-5-Fluoro-2-methyl-1-(p-methylsulfinylbenzylidene)-3-indenyl acetic acid 1-(4'-Chlorobenzylidene-2-methyl-5-fluoro-3-indenyl acetic acid (34.3 g., 0.1 mole) is dissolved in anhydrous pyridine and neutralized potentiometrically with a solution of benzyl trimethylammonium hydroxide (Triton B) in anhydrous pyridine. The solvents are removed under vacuum at 50° and the residue is dissolved in 500 ml. anhydrous tetrahydrofuran.

Activated magnesium turnings (2.5 g., slight excess) in 100 ml. anhydrous tetrahydrofuran under nitrogen is treated with a little benzyl chloride to start dissolution of the metal, then the above tetrahydrofuran solution of indene acetate salt is added gradually under reflux. When the magnesium has been consumed, the mixture is cooled and treated gradually under good stirring with 9.5 g. (slight excess) of methyl methanesulfinate in 100 ml. tetrahydrofuran; after 1 hour it is quenched with 60 ml. 10 percent aqueous acetic acid. Most of the tetrahydrofuran is evaporated, and the residue is poured into 1 l. water. Acidification to congo red paper with hydrochloric acid precipitates 5-fluoro-2-methyl-1-(p-methylsulfinylbenzylidene)-3-indenyl acetic acid, which is purified by recrystallization, m.p. 184–186°C.

EXAMPLE 7

D,L-cis-5-Fluoro-2-methyl-1-(p-methylsulfinylbenzylidene)-3-indenylacetic acid

To cis-5-fluoro-2-methyl-1-(p-methylthiobenzylidene)-3-indenylacetic acid (34.04 g., 0.1 mole) in acetonitrile (175 ml.) is added dropwise at 20–25°C. a solution of lead tetraacetate (44.34 g., 0.1 mole) in acetic acid (200 ml.). The mixture is stirred for 1 hour, then with continued stirring heated to 60°C. and maintained for 1 hour. The mixture is filtered, the filtrate concentrated to dryness in vacuo and the residue crystallized from ethyl acetate to yield D,L-cis-5-fluoro-2-methyl-1-(p-methylsulfinylbenzylidene)-3-indenyl acetic acid, m.p. 184–186°C.

EXAMPLE 8

D,L-cis-5-Fluoro-2-methyl-1-(p-methylsulfinylbenzylidene)-3-indenylacetic acid

To the sodium salt of cis-5-fluoro-2-methyl-1-(p-methylthiobenzylidene)-3-indenylacetic acid (36.34 g., 0.1 mole) in methanol (1 l.) at 5–10°C. is added with stirring t-butyl hydroperoxide (9.91 g., 0.11 mole) and 30 percent methanolic Triton B (2 ml.). The mixture is allowed to warm to room temperature (25°) over 2 hours with stirring. The mixture concentrated in vacuo to near dryness, water (500 ml.) added and the mixture acidified with concentrated hydrochloric acid. The mixture is filtered, the precipitate washed and dried and the residue recrystallized from ethyl acetate to yield D,L-5-cis-fluoro-2-methyl-1-(p-methylsulfinylbenzylidene)-3-indenylacetic acid, m.p. 184–186°C.

EXAMPLE 9

D,L-cis-5-Fluoro-2-methyl-1-(p-methylsulfinylbenzylidene)-3-indenylacetic acid

To cis-5-fluoro-2-methyl-1-(p-methylthiobenzylidene)-3-indenylacetic acid (34.04 g., 0.1 mole) in acetonitrile (175 ml.) is added at 5–10°C. with stirring perfluoroperoxyacetic acid, 1.1 M in glacial acetic acid (100 ml.). The mixture is stirred for 1 hour during which the temperature is allowed to warm to 25°C. then with continued stirring warmed to 50°C. The mixture is cooled to 20°C., sodium bisulfite (2 g.) in water (10 ml.) is added and the mixture is concentrated to dryness in vacuo. The residue is slurried with 500 ml. of water, brought to pH 2 and filtered. The precipitate is washed, dried in air at 40° and crystallized from ethyl acetate to yield D,L-cis-5-fluoro-2-methyl-1-(p-methylsulfinylbenzylidene)-3-indenylacetic acid, m.p. 184–186°C.

EXAMPLE 10

D,L-cis-5-Fluoro-2-methyl-1-(p-methylsulfinylbenzylidene)-3-indenylacetic acid

To cis-5-fluoro-2-methyl-1-(p-methylthiobenzylidene)-3-indenylacetic acid (34.04 g., 0.1 mole) in acetic acid (175 ml.) is added at 20–25°C. with stirring dibenzyl selenoxide (29.1 g., 0.105 mole). With constant stirring the mixture is maintained 2 hours at 25°, warmed to 50° and maintained for 30 minutes. The mixture is concentrated to dryness in vacuo, dissolved in ether-2N-sodium hydroxide and extracted with ether. The aqueous phase is acidified to pH 2 with concentrated hydrochloric acid, filtered, the residue dried and recrystallized from ethyl acetate to yield the product, m.p. 184–186°C.

EXAMPLE 11

D,L-cis-5-Fluoro-2-methyl-1-(p-methylsulfinylbenzylidene)-3-indenylacetic acid

To cis-5-fluoro-2-methyl-1-(p-methylthiobenzylidene)-3-indenylacetic acid (34.04 g., 0.1 mole) and vanadium pentoxide (1.0 g.) in acetic acid (175 ml.) at 5–10°C. is added dropwise 90% hydrogen peroxide (3.17 ml., 0.11 mole) in acetic acid (100 ml.). The mixture is stirred at room temperature for 1 hour, concentrated to near dryness in vacuo, water added (500 ml.) and the mixture filtered. The residue is dried and recrystallized from ethyl acetate to yield the product, m.p. 184–186°C.

EXAMPLE 12

D,L-cis-5-Fluoro-2-methyl-1-(p-methylsulfinylbenzylidene)-3-indenylacetic acid

To cis-5-fluoro-2-methyl-1-(p-methylthiobenzylidene)-3-indenylacetic acid (34.04 g., 0.1 mole) in methanol (175 ml.) at 10–15°C. is added dropwise with stirring iodosobenzene (23.1 g., 0.015 mole). While the stirring is continued, the temperature increases to 25°C. in 1 hour and with slow heating to 50°C. in 2 hours. The mixture is cooled, concentrated to dryness in vacuo, the residue taken up in 2N sodium hydroxide and ether and the aqueous phase extracted by ether. The aqueous phase is acidified with concentrated hydrochloric acid, filtered, the precipitate dried, and the residue recrystallized from ethyl acetate to yield the product, m.p. 184–186°C.

EXAMPLE 13

D,L-cis-5-Fluoro-2-methyl-1-(p-methylfinylbenzylidene)-3-indenylacetic acid

Into cis-5-fluoro-2-methyl-1-(p-methylthiobenzylidene)-3-indenylacetic acid (34.04 g., 0.1 mole) in thietane oxide (200 ml.) is passed nitrogen at a slow sweep for 2 hours. The mixture is heated for 10 hours, concentrated in vacuo and the residue after treatment with decolorizing charcoal in ethyl acetate is recrystallized to yield the product, m.p. 184–186°C.

What is claimed is:

1. A process wherein a compound of the formula:

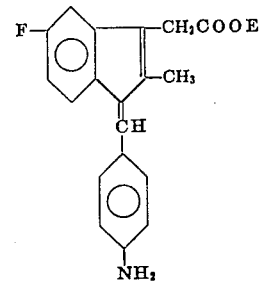

wherein E is hydrogen, lower alkyl or quaternary ammonium base, is a. diazotized to a diazonium compound;
b. said diazonium compound is treated with sulfur dioxide to form a sulfinic acid compound;
c. said sulfinic acid compound is treated with a chlorinating agent to form the corresponding chlorosulfinyl compound;
d. said chlorosulfinyl compound is esterified to form the corresponding ester;
e. said ester is treated with a alkyl magnesium halide followed by addition of an aqueous acid to form the 3-indenyl acetone compound; and
f. converting said 3-indenyl acetone compound to 5-fluoro-2-methyl-1-(p-methylsulfinylbenzylidene)-3-indenyl acetic acid by the haloform reaction.

* * * * *